Feb. 5, 1952 H. M. BASCOM 2,584,830
TELEPHONE SUBSTATION EQUIPMENT WITH
VARIABLE ANTISIDETONE CIRCUIT
Filed April 11, 1949
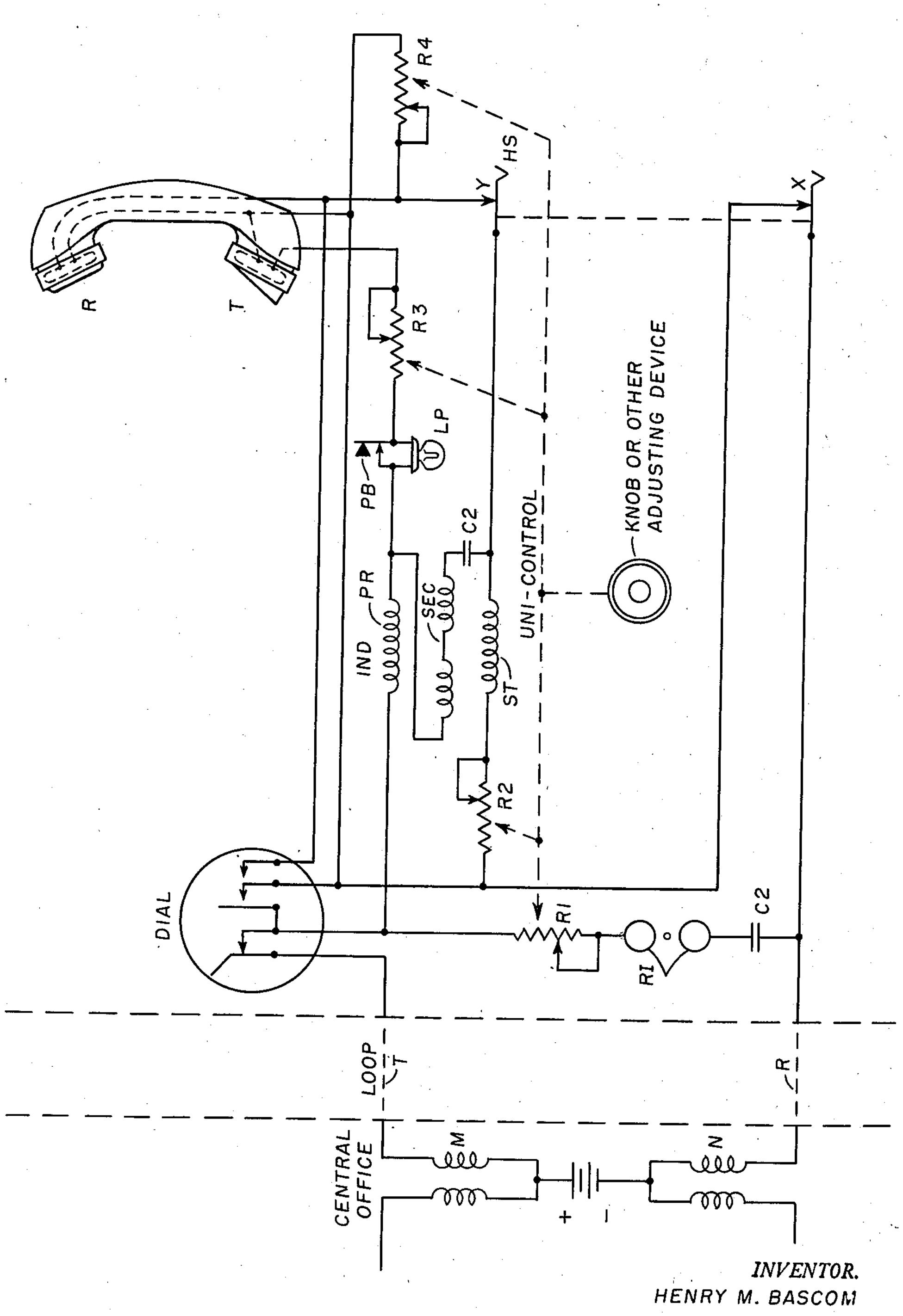
INVENTOR.
HENRY M. BASCOM
BY Winfred T. Powell
ATTORNEY Patented Feb. 5, 1952

2,584,830

UNITED STATES PATENT OFFICE 2,584,830

TELEPHONE SUBSTATION EQUIPMENT WITH VARIABLE ANTISIDETONE CIRCUIT

Henry M. Bascom, New York, N. Y., assignor to Stromberg-Carlson Company, a corporation of New York Application April 11, 1949, Serial No. 86,812

8 Claims. (Cl. 179—81)

This invention relates to telephone station equipment and it more particularly pertains to substation or subscribers' sets and circuits.

An object of the invention is to improve the transmission characteristics of the conversational circuit at the substation.

Another object of the invention is the provision of means for manually adjusting the resistance or impedance of certain portions of the substation circuit to obtain the proper characteristics for operation on the particular line to which the substation is connected.

A still further object of the invention is the provision of indicating means at the substation to indicate when the adjustment is properly made for the line to which the substation is connected.

An additional feature of the invention is an arrangement at the substation for manually adjusting the side tone circuit characteristics so that the side tone will be at a minimum and approximately the same on lines of various lengths.

Still an additional feature of the invention resides in the provision of an adjustment at the substation for including a resistance in the ringer circuit of a value determined by the distance of the substation from the central office.

An additional object of the invention is the provision of a uni-controlled device at the substation for including a resistance or impedance in the transmitter, in the receiver, in the ringer and in the side tone reduction circuits for properly regulating these separate resistances or impedances in accordance with the distance between the central office and the substation, together with a lamp or other indicating device to show the adjuster when these resistances or impedances are in proper adjustment for the characteristics of the line to which the substation is connected.

Difficulties have heretofore been experienced with the transmission characteristics of substation circuits when used on telephone lines having widely varying resistance values. For example, in common battery systems where the talking current is supplied to the lines through the windings of impedance coils in the central office, these lines may and usually do differ widely in their resistance values, with the result that the resistance of the circuit for one line is greater than that for another line. Consequently, one line obtains more current for transmission purposes than another, the anti-side tone circuit is not as effective on one line as on another and the best transmission results cannot be expected.

With the use of highly efficient transmitters and receivers at the substation, it is very desirable to provide some control for preventing excessive transmission gains and excessive side tone. It has also been found desirable to provide some control in the ringer circuit so that equalization can be obtained by providing fairly equal current flow through the ringers on all stations of a party line. The present invention accomplishes this result by means of a variable resistance or impedance in series with the ringer circuit and adjustable by the uni-controlled device which adjusts the other resistance or impedance devices in accordance with the distance of the station from the central office.

In the present invention, transmission equalization is obtained in the subscriber's loop by the provision of a manual adjustment which may be set by the service man or installer to meet the particular requirements for the subscriber's station, noisy or quiet location of the substation set, distance from the central office or the like. It is proposed to mount the adjusting device, the indicating device and the push button which renders the indicating device effective within the set where it is readily accessible to the service man.

The present invention will be readily understood from the following detailed description made with reference to the accompanying drawing which discloses a telephone substation circuit embodying the features of the invention. In this drawing the line or loop connects the substation to the current source in the office through impedance or repeating coil windings. For purposes of this description, no more of the central office circuits or apparatus need be shown, since the operation of the substation circuit alone is involved in the present invention, this substation circuit being connectable to lines of various lengths.

In the drawing there are shown two conductors leading to the central office, representing the tip T and ring R conductors, extending to a source of current which supplies line current to the substation. With the handset off the hook, transmitter current flows from the + side of the central office battery, coil M, line wire T, impulse contacts of the dial, primary winding PR of induction coil IND, normally closed contacts of push button PB, variable resistor R3, transmitter T, hook switch contact X, line wire R and coil N to the — side of the central office battery. Hook switch contact X is preferably adjusted to make before contact Y makes in order to close the above described battery supply circuit through the transmitter before the receiver circuit is closed. This is effective to reduce the click in the receiver which would be objectionable if the receiver circuit was closed first or at approximately the same time as the transmitter circuit.

The receiver circuit is connected across the transmitter in a "booster" circuit arrangement and may be traced from the lower terminal of the receiver R which is connected to the upper terminal of transmitter T. The other terminal of the receiver may be traced through contact Y of the hook switch, condenser C2, secondary winding SEC of the induction coil, push button contact PB and resistor R3 to the lower terminal of transmitter T.

Side tone reduction coil ST is connected across the receiver by way of a circuit which may be traced from the lower terminal of the receiver, resistor R2, coil ST and contact Y of the hook switch to the upper terminal of the receiver. The ringer circuit, including ringer RI and condenser C2, is across the line conductors and includes resistance R1. Neglecting the resistor elements R1, R2, R3 and R4, lamp LP and push button PB, it will be noted that the substation circuit disclosed is that of the well known anti-side tone type derived from the "booster" circuit.

When the telephone set is installed, or at any other time when adjustment is deemed necessary, the service man may open up the telephone and, by means of a single control knob or other adjusting device which preferably simultaneously controls resistors R1—R4, adjust these resistors to the proper value for the conditions under which this particular substation must operate. The different circuit elements are so proportioned with respect to the battery supply in the central office that, when lamp LP is connected in the circuit with the handset off the hook, the proper adjustment of these resistors is obtained when lamp LP changes from an illuminated to a non-illuminated condition. Consequently, the service man will operate push button PB which inserts lamp LP in the line circuit with the handset off the hook. Normally on a short loop this lamp will receive sufficient current to be illuminated. The service man now turns the knob for controlling resistors R1—R4 and when resistor R3 (in series with the transmitter circuit) reaches the proper value, lamp LP will be approximately extinguished, thus indicating that proper adjustment is obtained. At this time the value of resistor R4, which is shunted across receiver R, is such as to reduce the volume of the receiver below that which would otherwise be obtained on the short loop. Furthermore, the value of resistance R2, in the anti-side tone circuit, is of the proper value to reduce the side tone volume to the proper level. In addition to this, the value of resistance R1 in the ringer circuit is such as to increase the impedance of this circuit which would otherwise be placed across the line at a low value of loop resistance. When the proper adjustment has been obtained, as indicated by the extinguished condition of lamp LP, the service man releases the push button, thus removing lamp LP from the substation circuit. This leaves the circuit elements of the substation in proper condition and relation for most efficient operation for the length of loop over which the substation operates.

The dial is connected in the tip line conductor so that the operation of the dial opens and closes the line circuit in accordance with the digits transmitted. While the dial is off normal, the receiver R and other elements of the substation circuit are short circuited by the usual shunt springs to remove these elements from the circuit, thus providing improved pulsing conditions and the prevention of dial clicks in the receiver.

While the invention has been disclosed in connection with a dial telephone circuit, it is obvious that it is equally applicable to a manual telephone circuit. Moreover, the particular type of resistance elements employed in carrying out this invention, is not limited to those specifically disclosed and described herein, since other types of variable impedance devices may be employed without departing from the spirit and scope of the invention as described in the following claims.

What I claim is:

1. A telephone substation circuit including a transmitter and a receiver, a variably adjustable side tone control circuit connected in shunt with said receiver, a first variable impedance in series with said transmitter, a second variable impedance in shunt with said receiver and said side tone circuit, a third variable impedance connected in said side tone circuit, and means for controlling simultaneously said variable impedances.

2. A telephone substation circuit including a transmitter and a receiver, a variably adjustable side tone control circuit connected in shunt with said receiver, a first variable impedance in series with said transmitter, a second variable impedance in shunt with said receiver and said side tone circuit, a third variable impedance connected in said side tone circuit, an indicating device, and means for connecting said indicating device in series with said first impedance.

3. A telephone set circuit comprising an induction coil having a plurality of windings inductively inter-connected; a transmitter circuit including a transmitter, one of said induction coil windings and a variable resistance connected in series; a receiving circuit including a receiver and another of said induction coil windings connected in series and a variable resistance connected in shunt with said receiver; an anti-side tone circuit including still another of said induction coil windings and a variable resistance connected in series, said anti-side tone circuit being connected across said receiver; and a single device for adjusting said resistances.

4. A telephone set circuit comprising an induction coil having a plurality of windings inductively inter-connected; a transmitting circuit including a transmitter, one of said induction coil windings and a variable resistance connected in series; a receiving circuit including a receiver and another of said induction coil windings connected in series, and a variable resistance connected in shunt with said receiver; an anti-side tone circuit including still another of said induction coil windings and a variable resistance connected in series, said anti-side tone circuit being connected across said receiver; a single device for adjusting said resistances; and indicating means connectable in said transmitting circuit for indicating current flow in said telephone set circuit.

5. A telephone set circuit comprising an induction coil, a transmitting circuit including a transmitter and a variable resistance, a receiving circuit including a receiver and a variable resistance, an anti-side tone circuit including a winding of said induction coil and a variable resistance, a single uni-controlled device for manually adjusting said resistances, indicating means for indicating high and low current flow in said telephone set circuit, and a push button for connecting said indicating means in said telephone set circuit.

6. In combination, telephone lines having different resistance values, a telephone substation circuit having a load including a ringer normally connected across the line to which said substation circuit is connected, variable resistance elements at said substation for equalizing the transmission characteristics of said substation circuit and for equalizing said load when said substation circuit is connected to any one of said lines, and indicating means for indicating when said transmission and said load characteristics are properly equalized for the particular line to which said substation is connected.

7. A telephone substation circuit comprising a pair of line conductors, a transmitter having a pair of terminals, a receiver having a pair of terminals, a first connection from one terminal of said transmitter to one of said line conductors, a second connection from one terminal of said receiver to the other of said line conductors, a third connection from the other terminal of said transmitter to the other terminal of said receiver, a first variable impedance element included in said first connection, a second variable impedance element included in said second connection, said third connection being connected directly to said other line conductor, uni-controlled manually adjusting means for variably adjusting said impedance elements, and indicating means in said substation circuit for indicating when said impedance elements are properly adjusted for the line to which said substation circuit is connected.

8. In combination, telephone lines having different resistance values, telephone substation circuits each having a ringer normally connected across the line to which the associated substation is connected, variable resistance elements at each substation, means including certain of said elements for equalizing the transmission characteristics of said substation circuits, means including certain other of said elements for equalizing the voltages across said ringers, indicating means at each of said substations, and means for causing said indicating means to indicate that said certain other elements are properly adjusted to equalize said voltages for the particular line to which the associated substation is connected.

HENRY M. BASCOM.

REFERENCES CITED

The following references are of record in the file of this patent:

UNITED STATES PATENTS

| Number | Name | Date |
|---|---|---|
| 1,892,935 | De Forest | Jan. 3, 1933 |
| 1,921,499 | Bishop | Aug. 8, 1933 |
| 2,285,912 | De Monte | June 9, 1942 |
| 2,288,049 | Tillman | June 30, 1942 |
| 2,310,671 | Batchelor | Feb. 9, 1943 |
| 2,320,726 | Herckmans | June 1, 1943 |
| 2,375,791 | Johnson | May 15, 1945 |